(12) United States Patent
Kimura et al.

(10) Patent No.: US 7,297,654 B2
(45) Date of Patent: Nov. 20, 2007

(54) EXHAUST GAS-PURIFYING CATALYST

(75) Inventors: Mareo Kimura, Kakegawa (JP); Naoto Miyoshi, Kakegawa (JP); Hirohisa Tanaka, Ikeda (JP); Isao Tan, Ikeda (JP)

(73) Assignees: Cataler Corporation, Kakegawa-shi (JP); Daihatsu Motor Co., Ltd., Osaka (JP)

( * ) Notice: Subject to any disclaimer, the term of this patent is extended or adjusted under 35 U.S.C. 154(b) by 0 days.

(21) Appl. No.: 11/517,852

(22) Filed: Sep. 7, 2006

(65) Prior Publication Data

US 2007/0004589 A1 Jan. 4, 2007

Related U.S. Application Data

(63) Continuation of application No. PCT/JP2004/003213, filed on Mar. 11, 2004.

(51) Int. Cl.
*B01J 23/00* (2006.01)
*B01J 21/00* (2006.01)
*B01J 20/00* (2006.01)

(52) U.S. Cl. .............. 502/326; 502/302; 502/303; 502/304; 502/349; 502/339; 502/327; 502/328; 502/330; 502/333; 502/334; 502/439

(58) Field of Classification Search ........ 502/302–304, 502/326–328, 330, 333, 334, 339, 349, 439
See application file for complete search history.

(56) References Cited

U.S. PATENT DOCUMENTS 5,559,073 A * 9/1996 Hu et al. .................... 502/302
6,107,239 A * 8/2000 Qin et al. .................... 502/300
7,220,702 B2 * 5/2007 Hara et al. .................. 502/327

FOREIGN PATENT DOCUMENTS

| | | |
|---|---|---|
| EP | 1166855 | 1/2002 |
| JP | 11-028359 | 2/1999 |
| JP | 2000-015101 | 1/2000 |
| JP | 2001-347167 | 12/2001 |
| JP | 2002-518171 | 6/2002 |
| JP | 2003-117393 | 4/2003 |
| WO | WO-99/67020 | 12/1999 |

* cited by examiner

*Primary Examiner*—Cam N. Nguyen
(74) *Attorney, Agent, or Firm*—Morrison & Foerster LLP

(57) ABSTRACT

An exhaust gas-purifying catalyst includes a carrier, and an active component formed of a noble metal, carried by the carrier. The carrier has a core portion comprising a cubic or tetragonal stabilized zirconia-based composite oxide containing at least one stabilizing element, and a surface layer portion including a heat resistant zirconia-based composite oxide formed on a surface of the core portion. The surface layer has a specific surface area which is larger than a specific surface area of the core portion. A part of the noble metal is solid-solutioned into the zirconia-based composite oxide of the surface layer portion, and the balance of the noble metal is carried on a surface of the surface layer portion.

11 Claims, 2 Drawing Sheets

100nm

100nm

FIG. 2A    100nm
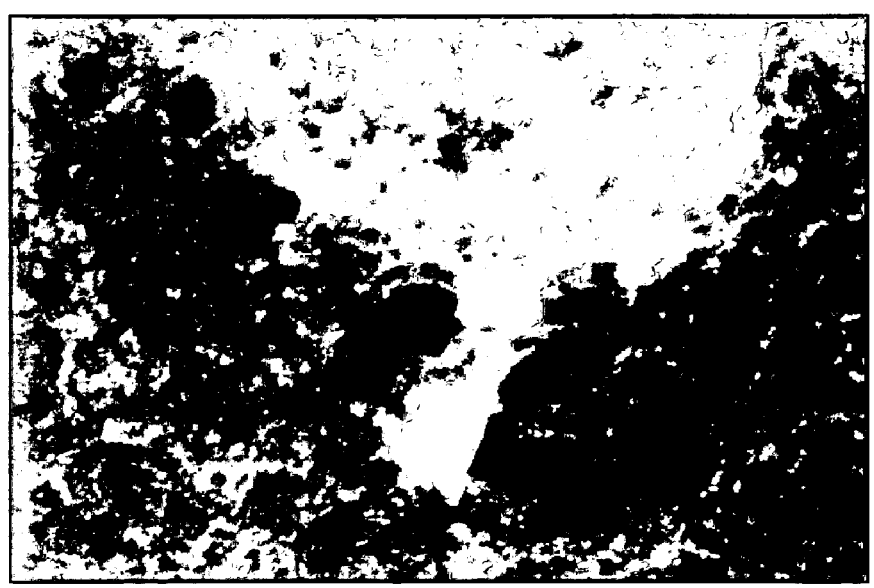
FIG. 2B    100nm

EXHAUST GAS-PURIFYING CATALYST

CROSS-REFERENCE TO RELATED APPLICATIONS

This is a Continuation Application of PCT Application No. PCT/JP2004/003213, filed Mar. 11, 2004, which was published under PCT Article 21(2) in Japanese.

BACKGROUND OF THE INVENTION

1. Field of the Invention

The present invention relates to an exhaust gas-purifying catalyst, and in particular to a motor vehicle exhaust gas-purifying catalyst having a carrier comprising a zirconium-based composite oxide.

2. Description of the Related Art

In recent years, the regulation of exhaust gas of motor vehicles is being made stricter, increasing the necessity for further decreasing the amounts of hydrocarbons (HC), carbon monoxide (CO) and nitrogen oxides ($NO_x$) in the exhaust gases.

Conventionally, a carried catalyst in which a noble metal (catalyst active component) such as rhodium (Rh) is carried on a porous carrier has been widely employed as an exhaust gas-purifying catalyst for motor vehicles. Such a carried catalyst is called a three-way catalyst because it can oxidize CO and HC and reduce $NO_x$ in the exhaust gas simultaneously.

Conventionally, γ-alumina is used as the carrier. However, γ-alumina undergoes phase-transition to α-alumina during use at high temperatures for a long period of time, and consequently the specific surface area of γ-alumina decreases. Further, there is also a problem that rhodium is solid-solutioned into the alumina during use at high temperatures, and the catalyst performances are lowered (see Jpn. Pat. Appln. KOKAI Publication No. 2001-347167).

Under the circumstances, carriers superior in heat resistance are required, instead of alumina. For example, Jpn. Pat. Appln. KOKAI Publication No. 2000-15101 discloses carrying rhodium on a zirconia support stabilized with an alkaline earth metal. Further, Jpn. Pat. Appln. KOKAI Publication No. 2002-518171 (corresponding to International Publication WO 99/67020) discloses a catalyst in which rhodium is carried on a zirconia support stabilized with a rare earth element.

In these prior arts, as the stabilized zirconia materials carrying rhodium, those having a large specific surface area are employed and rhodium is highly dispersed and carried on the surface of the zirconia.

However, the rhodium carried on the stabilized zirconia carrier having such a large specific surface area grows in its grains during use at high temperatures, accompanying the sintering of rhodium and embedding of the rhodium into the carrier particles, and the catalytic activity is lowered.

Accordingly, an object of the present invention is to provide an exhaust gas-purifying catalyst which is suppressed in lowering of the catalytic activity during use at high temperatures, even though it uses a stabilized zirconia-based composite oxide such as stabilized zirconia as the carrier material.

BRIEF SUMMARY OF THE INVENTION

The present inventors have conducted extensive studies with a view to achieving the aforementioned object, they have found that when a carrier is constructed such that a very thin surface layer consisting of a heat resistant (stabilized) zirconia having a relatively large specific surface area is formed on the surface of the core portion made of a stabilized zirconia particle having a relatively small specific surface area, and when a noble metal is carried on this surface area, the noble metal is preferentially carried on the surface layer having a large surface area. It has been also found out that when a part of the noble metal thus carried on the surface layer is solid-solutioned into the heat resistant (stabilized) zirconia of the surface layer, the solid-solutioned noble metal undergoes a repetition of cycles wherein the solid-solutioned noble metal precipitates, under a lean (reducing) atmosphere of high temperatures, as fine particles onto the surface layer of the carrier and the noble metal thus precipitated is solid-solutioned again, under a rich (oxidizing) atmosphere of high temperatures, into the surface layer, thereby making it possible to prevent the catalyst from being greatly deteriorated in catalytic performance even if the catalyst is used for a long period of time at high temperatures. Since the surface layer into which the noble metal is solid-solutioned is very thin, the solid-solutioning/precipitation of the noble metal are enabled to take place while sufficiently following up a short cycle of fluctuation of atmosphere between the lean/rich atmospheres under high temperatures. That noble metal, which is carried on the surface of surface layer but is not solid-solutioned, exhibits the catalytic activity at the initial stage where the solid-solutioned noble metal is incapable of exhibiting the catalytic activity. The present invention is based on these findings.

Thus, according to the present invention, there is provided an exhaust gas-purifying catalyst comprising a carrier, and an active component formed of a noble metal, carried by the carrier, the carrier having a core portion comprising a cubic or tetragonal stabilized zirconia-based composite oxide containing at least one stabilizing element selected from the group consisting of rare earth elements and alkaline earth elements, and a surface layer portion comprising a heat resistant zirconia-based composite oxide formed on a surface of the core portion, the surface layer having a specific surface area which is larger than a specific surface area of the core portion, a part of the noble metal being solid-solutioned into the zirconia-based composite oxide of the surface layer portion, and the balance of the noble metal being carried on a surface of the surface layer portion.

BRIEF DESCRIPTION OF THE SEVERAL VIEWS OF THE DRAWING

FIG. 2A is an SEM photograph of core particles employed in Example 1 at a magnification of 200,000; and FIG. 2B is an SEM photograph of the carrier prepared in Example 1 at a magnification of 200,000.

DETAILED DESCRIPTION OF THE INVENTION

Figure 1A:
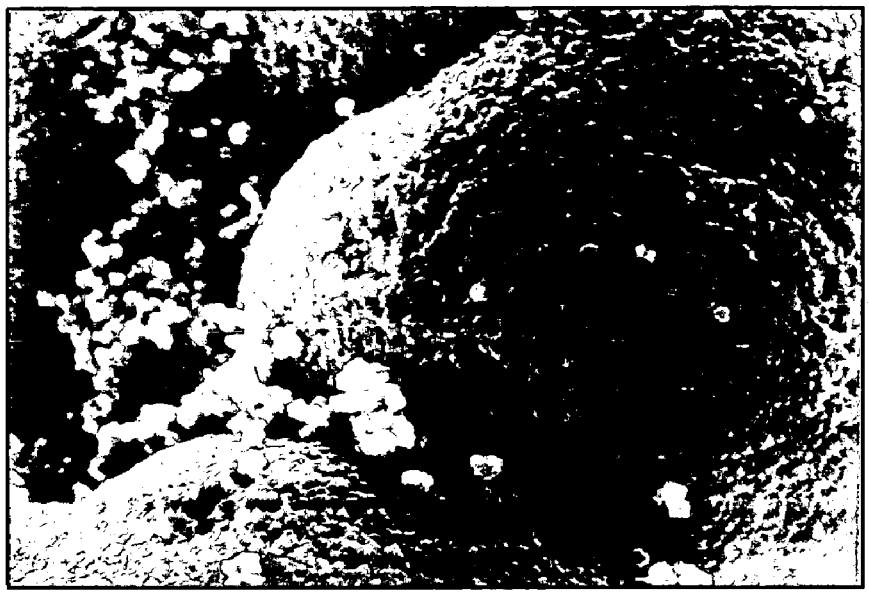
FIG. 1A is an SEM photograph of core particles employed in Example 1 at a magnification of 50,000.

The present invention will be explained more in detail below.

The carrier of an exhaust gas-purifying catalyst according to the present invention has a core portion comprising a stabilized zirconia-based composite oxide having a small specific surface area, and a surface layer portion (covering portion) covering the surface of the core portion. This surface layer portion comprises a heat resistant zirconia-based composite oxide having a large specific surface area. A catalytic active component comprising a noble metal is carried by the carrier having the core portion and the surface layer portion. A portion of the noble metal is solid-solutioned into the surface layer portion, while the balance of the noble metal is carried on the surface of the carrier. The specific surface area of the surface layer portion is larger than the specific surface area of the core portion.

In a preferable embodiment of the present invention, the ratio of the specific surface area $SSA_{sur}$ of the surface layer portion to the specific surface area $SSA_{cor}$ of the core portion, $SSA_{sur}/SSA_{cor}$, is 2 to 20. If this ratio $SSA_{sur}/SSA_{cor}$ is less than 2, the noble metal tends to be significantly carried also on the core portion. On the other hand, if this ratio $SSA_{sur}/SSA_{cor}$ exceeds 20, the sintering of the noble metal such as rhodium tends to become prominent.

The stabilized zirconia-based composite oxide constituting the core portion of the carrier of the exhaust gas-purifying catalyst of the present invention comprises zirconia which has been stabilized by the incorporation therein of at least one stabilizing element selected from the group consisting of rare earth elements and alkaline earth elements.

The rare earth elements as the stabilizing element include scandium, yttrium and lanthanoids. Among them, yttrium, lanthanum (La), cerium (Ce), neodymium (Nd) and praseodymium (Pm) are preferred with lanthanum being particularly preferred. The alkaline earth elements as the stabilizing element include calcium (Ca), strontium (Sr), barium (Ba) and radium (Ra), with barium being preferred. These stabilizing elements can be employed singly or in combination of two or more of these.

It is preferred that the stabilized zirconia-based composite oxide contains the stabilizing element in an amount of 3 to 20 atoms per 100 atoms of zirconium in the zirconia. If the amount of the stabilizing element is less than 3 atomic percent, the effect of stabilizing zirconia is not sufficiently exerted. On the other hand, if the amount of the stabilizing element exceeds 20 atomic percent, composite oxides relatively low in heat resistance will be caused to generate in the zirconia. The crystal structure of zirconia that has been stabilized by the stabilizing element is of cubic or tetragonal system.

The stabilized zirconia-based composite oxide particles constituting the core portion preferably have a specific surface area of not more than 50 $m^2/g$. The specific surface area is 15 $m^2/g$ or more in general. More preferably, the stabilized zirconia-based composite oxide have a specific surface area of 15 $m^2/g$ to 30 $m^2/g$. Further, the stabilized zirconia-based composite oxide particles of the core portion preferably have an average particle diameter of 5 μm to 30 μm. These stabilized zirconia-based composite oxides are commercially available.

The heat resistant zirconia-based composite oxide included in the surface layer portion covering the core portion is preferably formed of the same stabilized zirconia-based composite oxide as the stabilized zirconia-based composite oxide included in the core portion except that the specific surface area thereof is larger than that of the core portion as described above. The surface layer portion preferably has a specific surface area of 60 $m^2/g$ to 300 $m^2/g$. Further, it is preferable that the surface layer portion is provided at a ratio of 0.1 to 10% by weight of the core portion. If the ratio of the surface layer portion is less than 0.1% by weight of the core portion, the coverage of the core portion by the surface layer portion will be lowered, and the initial catalytic function can not exhibit sufficiently. On the other hand, if the ratio of the surface layer portion is larger than 10% by weight of the core portion, the thickness of the surface layer portion will become too large, resulting in that the surface layer portion will be easily peeled off from the core portion, and at the same time, the solid-solutioning/precipitation of the noble metal are more likely to fail to sufficiently follow up a short cycle of fluctuation of atmosphere between the lean/rich atmospheres at high temperatures. Especially, if the surface layer portion is present in an amount of 0.1-10% by weight of the core portion, the stabilized zirconia-based composite oxide of the surface layer portion is permitted to exist as particles 5 nm-15 nm in diameter on the surface of the core portion, thereby making it possible to more quickly repeat a cycle of the solid-solutioning/precipitation of the noble metal. It is more preferable for the surface layer portion to be present in a ratio of 1-5% by weight of the core portion. Further, the coverage of the surface of the core portion by the surface layer portion is preferably not less than 50%.

As the noble metal providing the catalyst active component, rhodium, palladium, an alloy of rhodium and platinum, an alloy of palladium and platinum, etc may be preferably exemplified. Among them, rhodium is more preferable. In the catalyst of the present invention, a part of the noble metal carried by the surface layer portion of the carrier is solid-solutioned into the heat resistant zirconia-based composite oxide of the surface layer portion, while the balance of the noble metal is carried on the surface of the surface layer portion of the carrier. The total quantity of the noble metal carried is usually 0.1% to 5%, preferably 0.3% to 2% of the total weight of the catalyst (carrier+noble metal). The rate of solid-solutioning of the noble metal (the ratio of the solid-solutioned noble metal to the total weight of the carried noble metal) is preferably not less than 50% in general.

To prepare the catalyst of the present invention, firstly, the stabilized zirconia-based composite oxide particles constituting the core portion is covered with the heat resistant zirconia-based composite oxide. Then, a noble metal is carried on the resultant composite carrier, and a part of the noble metal is solid-solutioned into the surface layer portion of the carrier.

In order to cover the stabilized zirconia-based composite oxide particles constituting the core portion with the heat resistant zirconia-based composite oxide, it is possible to employ any method known per se in the art. For example, an aqueous dispersion of the stabilized zirconia-based composite oxide particles (core particles) is added with an aqueous solution of a water soluble zirconium salt which is a precursor of zirconia (for example, zirconium oxynitrate (ZrO(NO$_3$)$_2$), zirconium sulfate (Zr(SO$_4$)$_2$), etc.) and with a neutralizing agent (for example, ammonium hydrogencarbonate, ammonia, etc.) to deposit the zirconia precursor on the core particles. The particles thus obtained are filtered and washed with water. The particles thus washed with water are dried preferably for 1 to 48 hours at a temperature of 50 to 200° C., and then baked preferably at a temperature of 650 to 1000° C. for 1 to 12 hours, preferably for 2 to 4 hours in an oxidizing atmosphere (for example, atmospheric air). In these ways, core particles covered with zirconia are obtained.

In order to enhance the heat resistance of the zirconia of the surface layer, the zirconia-coated core particles are dipped into an aqueous solution containing a stabilizing element in the form of a water-soluble salt to impregnate the stabilizing element into the zirconia covering layer. Then, the resultant particles are dried under the same conditions as described above and then baked under the same conditions as described above. In this case, it is possible to obtain a stabilized zirconia (heat resistant zirconia) which contains the stabilizing element at substantially the same ratio as the ratio of the charged water-soluble salt of a stabilizing element to zirconia. As the water-soluble salt of the stabilizing element, an inorganic acid salt such as a sulfate, nitrate, hydrochloride, phosphate, etc. and an organic acid salt such as an acetate, oxalate, etc may be exemplified. Among them, a nitrate is preferable. Further, the covering layer may be formed by using a mixture of a zirconium salt and a salt of the stabilizing element.

According to an alkoxide method, a dispersion of the core particles in an organic solvent (for example, isopropanol, ethanol, etc.) is added with a solution of zirconium alkoxide (for example, tetranormalbutoxy zirconium ($Zr(OC_4H_9)_4$), etc.) in an organic solvent and with an aqueous solution of the aforementioned stabilizing element to hydrolyze the zirconium alkoxide, thus obtaining a dispersion in which a precursor containing zirconium and the stabilizing element is precipitated. Then, this dispersion is evaporated to dryness. The evaporated and dried product is then dried under the same conditions as described above and baked under the same conditions as described above. Thus, a stabilized zirconium surface layer is formed on the surface of the core particles. In this case, it is possible to obtain a stabilized zirconia (heat resistant zirconia) which contains the stabilizing element at substantially the same ratio as the ratio of the charged water-soluble salt of the stabilizing element to zirconium alkoxide.

Instead of the aforementioned methods, it is possible to employ a known chelate method and a sol-gel method.

In order to carry the noble metal on the carrier of the present invention which can be obtained as described above, firstly, the carrier particles are placed in an aqueous solution containing a predetermined quantity of the noble metal in the form of a water-soluble salt to adsorb and carry the noble metal salt on the surface of the carrier. The resultant product is filtered and dried. In this case, the noble metal employed can be entirely adsorbed and carried on the surface of the carrier. The dried particles thus obtained can be baked in air under temperature and time conditions sufficient to solid-solution the noble metal into the stabilized zirconia powder. The baking temperature for the solid-solutioning of the solid solution is preferably 700° C. to 1000° C. If the baking temperature is less than 700° C., it may become difficult to solid-solution the noble metal into the carrier. On the other hand, if the baking temperature is higher than 1000° C., the growth of zirconia particles constituting the surface layer become prominent, and the surface layer tends to be easily peeled off from the core. The baking temperature is preferably 700° C. to 900° C. The baking time is 2 to 4 hours in general, it may vary depending on the baking temperature, t. The rate of the solid-solutioning of the noble metal can be adjusted by the baking time. Incidentally, as the aforementioned water-soluble noble metal salt, an inorganic acid salt such as a nitrate, hydrochloride, etc may be exemplified. Among them, a nitrate is preferable. In this solid-solutioning, 30% to 90% by weight of the noble metal that has been initially carried on the surface of the surface layer of the stabilized zirconia carrier can be solid-solutioned into the stabilized zirconia.

The catalyst thus obtained can be used after it has been formed into pellets.

The quantity of the noble metal that has been solid-solutioned into the stabilized zirconia can be measured through the analysis using ICP spectrometry. More specifically, the catalyst is dipped into a solvent which is incapable of dissolving fine particles of a noble metal oxide which can exist on the surface of the carrier but is capable of dissolving the stabilized zirconia (including the solid-solutioned noble metal) constituting the carrier. Then, the resultant mixture is sufficiently stirred to dissolve the stabilized zirconia. Then the resultant solution is analyzed for the noble metal by means of ICP spectrometry. As the solvent, a solution of hydrogen fluoride and water at a volume ratio of 1/15 to 1/4 is used and the dissolution operation can be performed at room temperature (20° C.-30° C.) for 12 hours.

As already explained above, the exhaust gas-purifying catalyst of the present invention undergoes a repetition of cycles wherein the solid-solutioned noble metal precipitates as fine particles of the order of nanometers onto the surface of the carrier under a rich (reducing) atmosphere of high temperatures where the air-fuel ratio of the engine of a motor vehicle is relatively small, i.e. the concentration of fuel is relatively high, and the noble metal thus precipitated is solid-solutioned again into the surface of the carrier under a lean (oxidizing) atmosphere of high temperatures where the air-fuel ratio of the engine of a motor vehicle is relatively large, i.e. the concentration of fuel is relatively low and an excess of oxygen is present, thereby making it possible to suppress the grain growth of the noble metal and maintain a high catalytic activity, without the catalytic performance being greatly deteriorated even if the catalyst is used for a long period time under the conditions where the fluctuation of lean/rich atmospheres takes place at a short cycle under high temperatures. It is believed that the solid-solutioned noble metal is highly dispersed as particles of the order of atoms under a reducing atmosphere. On the other hand, the noble metal that has been carried on the surface of the surface layer portion of the carrier is enabled to exhibit the catalytic activity thereof from the initial stage of use at which the solid-solutioned noble metal does not function as a catalyst. Thus, the exhaust gas-purifying catalyst of the present invention sufficiently exhibits the catalytic activity for a long period of time beginning from the initial stage of use. Further, the catalyst of the present invention is relatively small in quantity of the surface layer portion of the carrier and the noble metal is carried on the surface layer portion which is relatively small in quantity, thereby making it possible to reduce the quantity of the noble metal used.

EXAMPLE 1

(A) Commercially available zirconia particles stabilized by lanthanum and cerium (specific surface area: 24 $m^2/g$, cubic system, and 13 μm in average particle diameter: Daiichi Kigenso Co., Ltd.) were used as core particles. Twenty grams of the core particles were charged in 100 mL of ion-exchanged water, and stirred for about 30 minutes at a rotation speed of 1000-2000 rpm using a homogenizer to sufficiently disperse the core particles. Then, the stirring by the homogenizer was switched to the stirring by a stirrer. Then, 200 mL of an aqueous solution containing zirconium oxynitrate in an amount which is sufficient to produce zirconium in an amount corresponding to 5% by weight of the core particles and 200 mL of an aqueous solution of ammonium hydrogencarbonate (neutralizing agent) at a concentration of 0.1 mol/L were added drop-wise using a metering pump to the dispersion of the zirconia particles over two hours. The precipitate thus obtained was filtered, washed with water and dried for 10 hours at 80° C., and then was baked for 3 hours at 600° C. to afford desired zirconia-covered core particles.

(B) Then, in order to enhance the thermal stability of the zirconia particles adhering onto the core particles, the zirconia-covered core particles obtained in (A) above were impregnated with an aqueous solution containing lanthanum nitrate in an amount corresponding to 10 mol % of the covering zirconia, and thee were dried for 10 hours at 80° C. and baked for 3 hours at 600° C., thus obtaining carrier particles having a core portion and a surface layer portion. It was confirmed through X-ray diffraction analysis that the crystal structure of the stabilized zirconia of the surface layer thus obtained was of a cubic system which is excellent in thermal stability. Further, the specific surface area of the surface layer portion was 260 m²/g, as measured by means of a BET surface area analyzer.

(C) The carrier particles obtained in (B) above were added to an aqueous solution of rhodium nitrate containing rhodium in an amount corresponding to 0.3% by weight of the carrier particles obtained in (B) above. The resultant mixture was stirred for 30 minutes and then-filtered and washed with water. The filtrate and the washings were combined and was analyzed by means of ICP spectrometry, detecting no rhodium. Namely, the ratio of rhodium carried on the carrier was 100%. The carrier particles washed as described above were dried for 10 hours at 80° C. and then baked at 250° C. for one hour, and then baked up to 800° C. with the temperature being increased at a rate of 10° C./min. over 3 hours to solid-solution a part of the carried rhodium into the surface layer portion. Then, a portion of the stabilized zirconia with the solid-solutioned rhodium was dipped into a solution of hydrogen fluoride and water at a volume ratio of 1/15 for 12 hours at room temperature, thereby dissolving the zirconia. The quantity of rhodium in the solution thus obtained was then analyzed by means of ICP spectrometry, confirming that 70% of the rhodium that had been initially carried on the surface of the stabilized zirconia was solid-solutioned into the stabilized zirconia.

(D) The catalyst powder thus obtained as described above was then compression-molded and pulverized and sized into pellets having a size of 0.5 to 1.0 mm, thereby obtaining the desired catalyst.

Figure 1B:
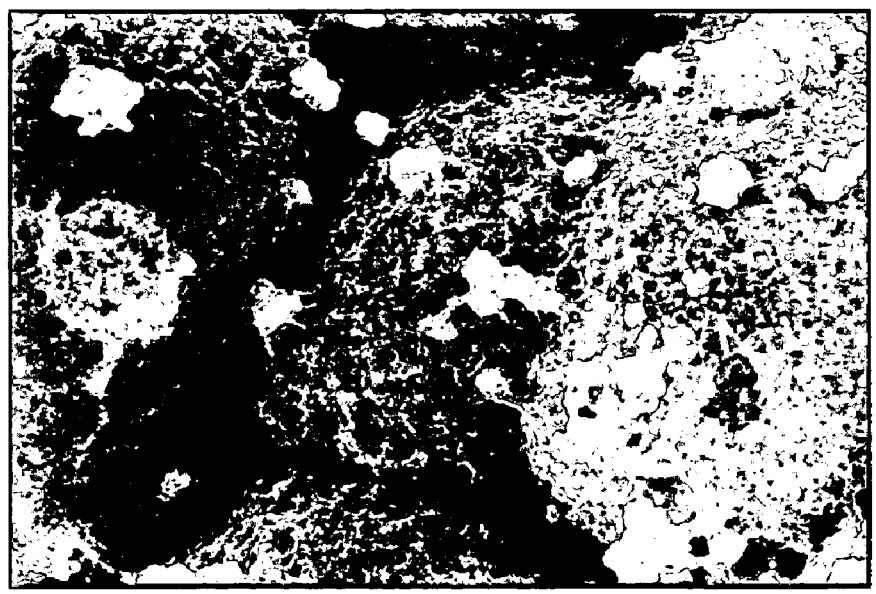
FIG. 1B is an SEM photograph of the carrier prepared in Example 1 at a magnification of 50,000.

FIG. 1A shows an SEM photograph, at a magnification of 50,000, of the core particles used in Example 1, and FIG. 1B shows an SEM photograph, at a magnification of 50,000, of the carrier prepared in Example 1. Further, FIG. 2A shows an SEM photograph, at a magnification of 200,000, of the core particles used in Example 1, and FIG. 2B shows an SEM photograph, at a magnification of 200,000, of the carrier prepared in Example 1. It can be seen from a comparison between FIG. 1A and FIG. 1B, as well as between FIG. 2A and FIG. 2B, that the stabilized zirconia particles having a particle diameter of 10 nm or less are adhered onto the surface of the core particles of the carrier obtained in Example 1.

EXAMPLE 2

A pellet-like catalyst was prepared by repeating the same procedures as in Example 1 except that an aqueous solution containing zirconium oxynitrate in an amount to produce zirconium in an amount corresponding to 1% by weight of the core particles was used in (A) of Example 1. The rate of the solid-solutioning of the rhodium was 55% by weight.

EXAMPLE 3

One hundred grams of the same core particles as in Example 1 was mixed with an amount, which corresponded to 1% by weight of core particles, of tetra n-butoxy zirconium in 200 g of isopropanol ($ZrO_2$: 28.7 wt %) and with an aqueous solution of an amount, which corresponded to 10 mol % of the covering zirconia, of lanthanum nitrate in 5 g of ion-exchanged water, and was stirred for 30 minutes at a rotation speed of 7000 rpm by using a homogenizer. Then, the resultant mixture was subjected to evaporation by using a rotary evaporator under a reduced atmosphere of 150 mmHg at 50° C. to remove the solvent to dryness. The evaporated and dried product thus obtained was dried for 2 hours at 100° C. and then baked for 3 hours at 600° C., and was pelletized. The quantity of rhodium carried by the catalyst thus obtained was 0.3% by weight and the ratio of the solid-solutioning of rhodium was 65%.

EXAMPLE 4

A pellet-like catalyst was obtained by repeating the same procedures as described in Example 1 except that a predetermined quantity of zirconium oxynitrate which was sufficient to produce an amount of zirconium corresponding to 10% by weight of core particles was employed in (A) of Example 1. The ratio of the rhodium carried by the catalyst was 0.3% by weight and the ratio of solid-solutioning of rhodium was 80% by weight.

COMPARATIVE EXAMPLE 1

A pellet-like catalyst was obtained by repeating the same procedures as described in Example 1 except that no surface layer portion was formed on the core material. The ratio of the rhodium carried on the catalyst was 0.3% by weight and the ratio of solid-solutioning of rhodium was 10% by weight.

COMPARATIVE EXAMPLE 2

A pellet-like catalyst was obtained by repeating the same procedures as described in Example 1 except that the step (B) of Example 1 was omitted.

The catalytic activity after an aging treatment of each of the catalysts obtained in Examples 1 to 4 and in Comparative Examples 1 and 2 was evaluated according to the following procedures.

<Aging Treatment>

The pellet-like catalysts obtained in Examples 1 to 4 and in Comparative Examples 1 and 2 were respectively charged in a flow-type aging apparatus. Then, at the catalyst bed temperature of the aging apparatus of 1000° C., a model rich gas consisting of 300 parts by volume of nitrogen gas added with 30 parts by volume of carbon monoxide gas, and a model lean gas consisting of 300 parts by volume of nitrogen gas added with 15 parts by volume of oxygen gas were alternately and continuously passed through the aging apparatus at a flow rate of 1000 mL/min. and at intervals of 5 minutes for 30 hours. Thereafter, the catalysts were respectively taken out of the aging apparatus and subjected to the following catalytic activity evaluation test.

<Catalytic Activity Evaluation>

Catalyst samples are individually placed in an atmospheric pressure flow-type fixed bed reactor. Then, while flowing a model gas corresponding to the stoichiometry, the catalyst samples are respectively heated at a heating rate of 12° C./min. from 100° C. up to 500° C., during which the purification rate with regard to CO, $NO_x$ and HC is continuously measured. Then, the temperatures at which CO, $NO_x$ and HC are respectively removed or reduced by 50% (50% purification temperature) are recorded as an indication of purification rate.

The results obtained are shown in the following Table 1.

TABLE 1

| Catalyst | 50% purification temperature | | |
|---|---|---|---|
| | CO | NO$_x$ | HC |
| Ex. 1 | 216° C. | 219° C. | 232° C. |
| Ex. 2 | 220° C. | 223° C. | 235° C. |
| Ex. 3 | 218° C. | 221° C. | 232° C. |
| Ex. 4 | 224° C. | 235° C. | 242° C. |
| Comp. Ex. 1 | 235° C. | 238° C. | 250° C. |
| Comp. Ex. 2 | 227° C. | 236° C. | 240° C. |

As seen from the results shown in Table 1, the catalysts of the present invention were lower in 50% purification temperature as compared with the catalysts of the Comparative Examples. This indicates that the exhaust gas-purifying catalysts of the present invention were not only capable of exhibiting excellent catalytic performance at the initial stage of use, but also capable of preventing the catalytic performance from being greatly deteriorated even if they were used for a long period of time at high temperatures.

The present invention has been described with reference to various embodiments, but the present invention should not be construed as being limited to these embodiments. Various modifications of constituent elements may be made without departing from the spirit or scope of the present invention in actual use thereof. Further, the constituent elements described in these various embodiments may be suitably combined.

What is claimed is:

1. An exhaust gas-purifying catalyst comprising a carrier, and an active component formed of a noble metal, carried by the carrier, the carrier having a core portion comprising a cubic or tetragonal stabilized zirconia-based composite oxide containing at least one stabilizing element selected from the group consisting of rare earth elements and alkaline earth elements, and a surface layer portion comprising a heat resistant zirconia-based composite oxide formed on a surface of the core portion, the surface layer having a specific surface area which is larger than a specific surface area of the core portion, a part of the noble metal being solid-solutioned into the zirconia-based composite oxide of the surface layer portion, and the balance of the noble metal being carried on a surface of the surface layer portion.

2. The catalyst according to claim 1, wherein a ratio of a specific surface area of the surface layer portion to a specific surface area of the core portion is 2 to 20.

3. The catalyst according to claim 1, which contains the surface layer portion in an amount of 0.1 to 10% by weight of the core portion.

4. The catalyst according to claim 1, wherein the heat resistant zirconia-based composite oxide is of a cubic or tetragonal system containing at least one rare earth element.

5. The catalyst according to claim 1, wherein the core portion has a specific surface area of 50 m$^2$/g or less.

6. The catalyst according to claim 1, wherein the core portion has a specific surface area of 15 m$^2$/g to 30 m$^2$/g.

7. The catalyst according to claim 1, wherein the surface layer portion has a specific surface area of 60 m$^2$/g to 300 m$^2$/g.

8. The catalyst according to claim 1, wherein the surface layer portion is formed of zirconia stabilized with at least one rare earth element.

9. The catalyst according to claim 1, wherein the noble metal is rhodium, palladium, an alloy of rhodium with platinum or an alloy of palladium with platinum.

10. The catalyst according to claim 1, wherein the noble metal is carried in an amount of 0.1 to 5.0% by weight.

11. The catalyst according to claim 1, wherein a rate of solid-solutioning of the noble metal is 30% to 90%.

* * * * *